April 5, 1927.　　　G. A. ROBERTSHAW　　　1,623,755

THERMOSTAT

Filed Sept. 6, 1921　　　3 Sheets-Sheet 1

INVENTOR
George A. Robertshaw,

April 5, 1927.
G. A. ROBERTSHAW
THERMOSTAT
1,623,755
Filed Sept. 6, 1921  3 Sheets-Sheet 2
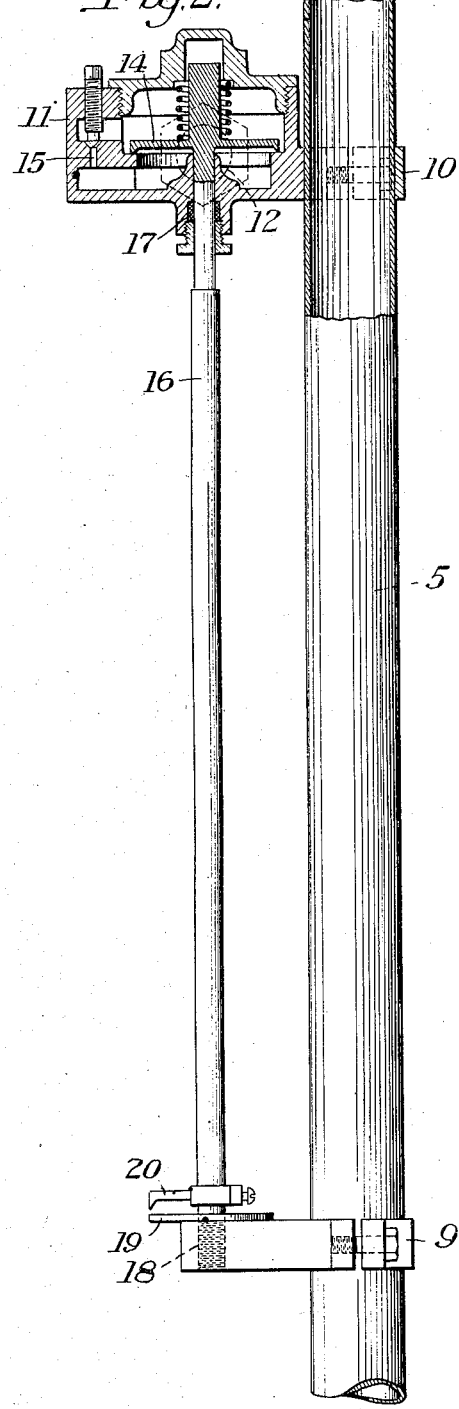
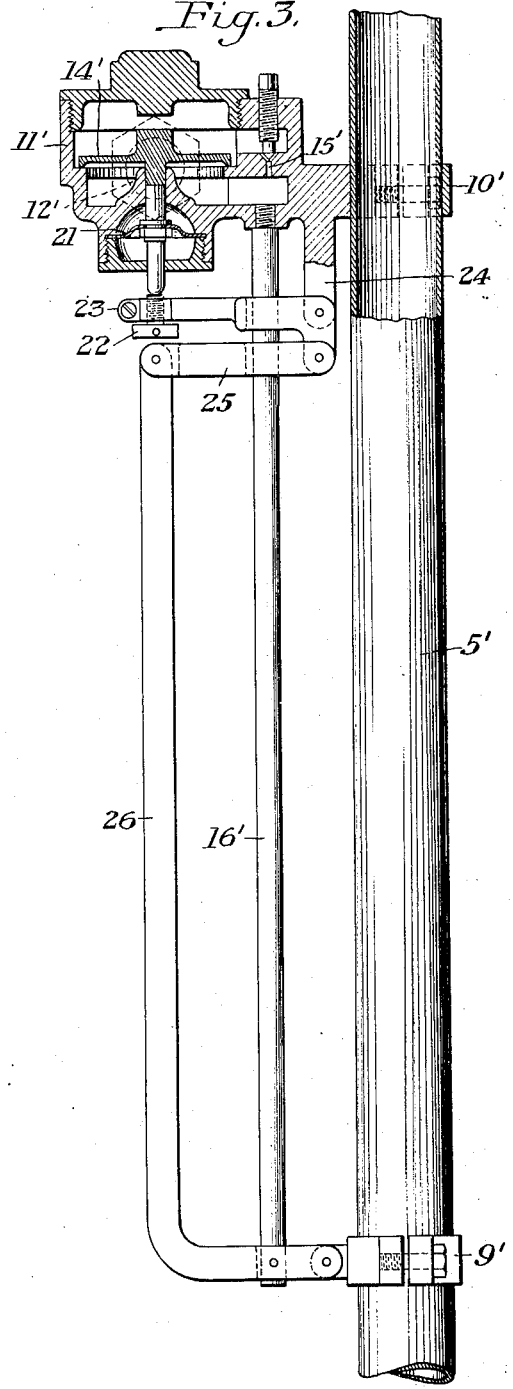
INVENTOR
George A. Robertshaw,
Byrnes, Stebbins, Burgess Parmelee,
his attys.

April 5, 1927.
G. A. ROBERTSHAW
THERMOSTAT
1,623,755
Filed Sept. 6, 1921      3 Sheets-Sheet 3
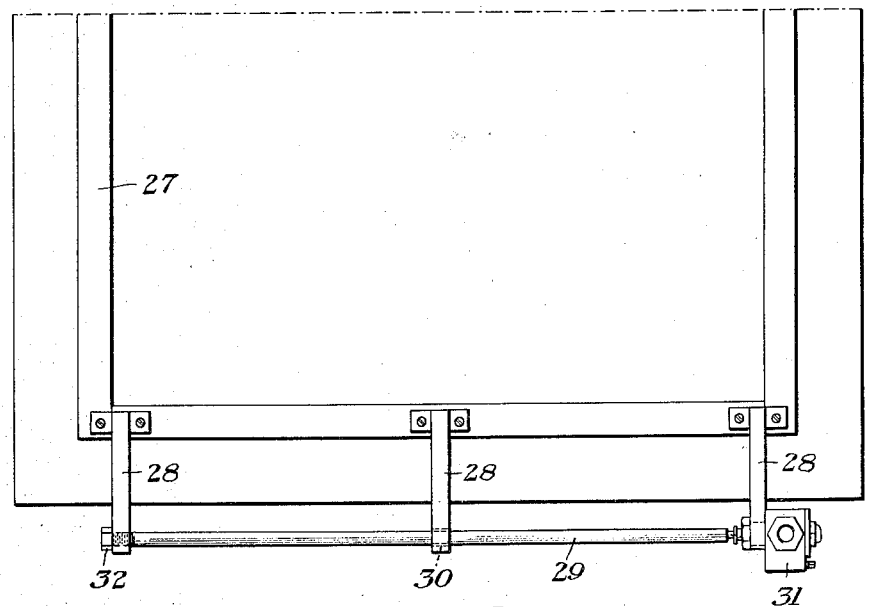
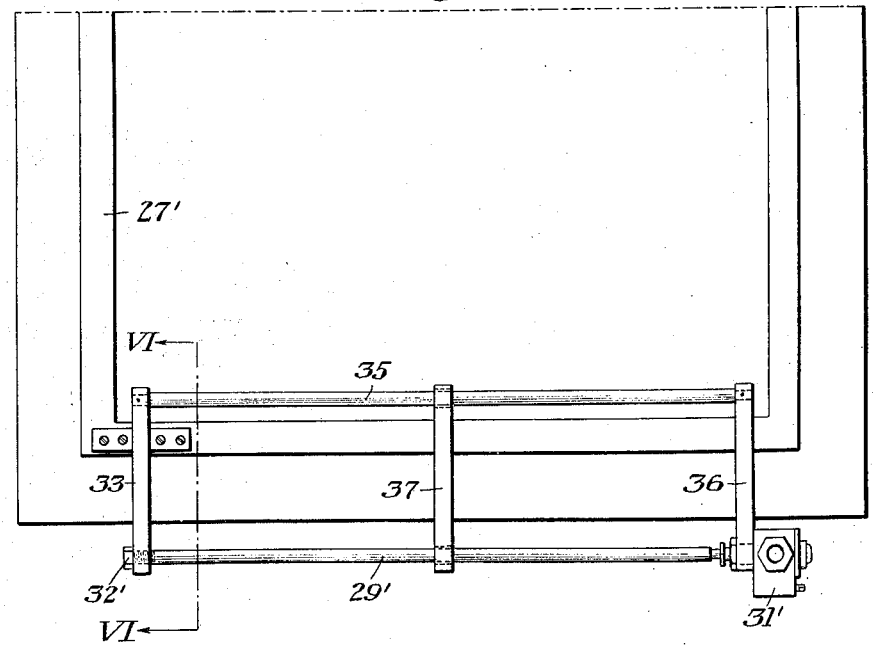
INVENTOR
George A. Robertshaw, Patented Apr. 5, 1927.

1,623,755

UNITED STATES PATENT OFFICE.

GEORGE A. ROBERTSHAW, OF GREENSBURG, PENNSYLVANIA.

THERMOSTAT.

Application filed September 6, 1921. Serial No. 498,795.

The present invention relates broadly to heat regulating means, and more particularly to a thermostatic regulating means of this character.

An important object of the present invention is to provide a thermostatic control adapted to be applied to gas heated installations of various characters in such manner as to utilize a portion of the installation as the expanding element of the thermostat.

Another object of the invention is to provide a thermostat, the working parts of which are not subjected to the destructive influences of a fluid or molten material, the temperature of which is being controlled.

Still another object of the present invention is to provide a thermostat which will be more easily and less expensively installed and maintained.

A still further object of the present invention is to provide a thermostat having a novel form of relatively non-expansible element.

The foregoing and other objects of the present invention, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 2 is a detail view partly in section of a portion of the construction illustrated in Figure 1;

Figure 3 is a view corresponding to Figure 2 illustrating a modified form of thermostat;

Figure 4 is a top plan view of a melting pot having the improved thermostat applied thereto;

Figure 5 is a view corresponding to Figure 4 but illustrating a modified form of thermostat.

At the present time, it is customary to provide thermostats of various types comprising an expansible and a relatively non-expansible member. By the use of the present invention the provision of a separate expansible member is rendered unnecessary.

Thermostat regulators for use, for example, with gas fired water heaters of the storage type have involved such a construction that a water pressure connection was required. This connection necessitated extra piping thereby increasing the expense, and subjected certain operating parts of the thermostatic device to the corrosive action of the water. This prevented the use of aluminum, zinc, and similar metals, which are highly sensitive to the action of corrosive or saturated waters.

Thermostatic regulators as heretofore used in connection, more particularly, with gas fired water heaters of the storage type, have customarily been installed near the bottom of the tank or in the circulating pipe returning from the tank to the heater. In either event there has been no means for positively controlling the maximum temperature in the top of the tank, as the temperatures in the top and bottom differ greatly, the difference depending upon the ease of circulation through the hot tank and circulating pipes, as well as upon the heating capacity thereof and the heat convection.

The present invention obviates the objections which have existed with devices of this character as heretofore used and provides an inexpensive means of control, capable of regulating absolutely the maximum temperature and uneffected by the corrosive or deteriorating action of the fluids in connection with which it is used. It also provides means for practically preventing corrosion of the pipes and tanks by the fluids in connection with which it is used, as it is effective for maintaining the highest temperature definitely below 150° C., which is the temperature at which line deposits.

Figure 1:
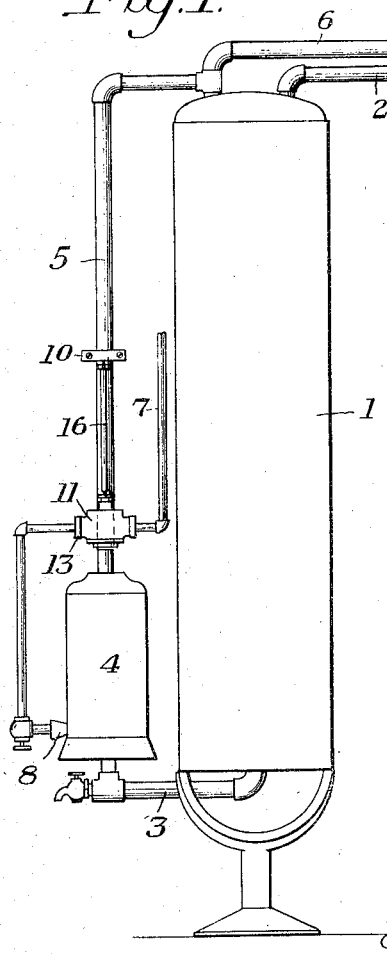
Figure 1 is a side elevation of a water heater of the storage type having the improved thermostat applied thereto.

Referring more particularly to the drawings, there is illustrated in Figure 1 a gas fired water heater of the storage type comprising the usual storage reservoir 1, having a cold water inlet 2 at the top thereof, and a circulating pipe 3 leading from the bottom and supplying water to the heater 4, which may be of any suitable construction. The hot water from the heater passes upwardly through the circulating pipe 5 into the top of the tank, or may make connection directly to the water heater outlet 6, as indicated. The gas for the heater 4 is supplied through the pipe 7 leading to the burner 8. At an intermediate portion of the pipe 7 is placed the thermostatically controlled valve which will be more fully described hereinafter.

Referring more particularly to Figure 2 of the drawings, there is illustrated a portion of the circulating pipe having secured thereto, in any desired manner, a lower clamp or bracket 9 and an upper clamp or bracket 10. The upper bracket 10 carries a casing 11 having a fuel inlet 12 communicating with the pipe 7, and a suitable outlet connection 13 leading to the burner 8. Intermediate the inlet and outlet connections is provided a spring seated valve 14 of any well known type. A suitable by-pass 15 may be provided. Cooperating with the valve stem is a relatively non-expansible element 16 extending through a stuffing box 17 and having a threaded engagement 18 at its lower end with the bracket 9. This bracket may be provided with a dial 19 and the relatively non-expansible element 16 may have secured thereto a pointer 20 whereby the device may be adjusted for different degrees of temperature. By reason of the provision of a relatively non-expansible element extending into the valve casing 11, it will be apparent that practically unlimited pressure can be put on the stuffing box to provide an effective seal.

The non-expansible element preferably employed in this construction comprises an alloy of iron or steel with a nickel content of from thirty to forty percent. This alloy has been found to have an expansion coefficient much lower than iron or steel as commonly used.

With a construction of this character, it will be apparent that as the circulating pipe 5 expands under the influence of the heated water passing therethrough, it will tend to move apart the brackets 9 and 10, thereby permitting the valve 14 to close and restrict the supply of fuel to the burner. On the other hand, as the pipe 5 contracts, the relatively non-expansible element 16 will become effective for opening the valve to supply more fuel to the burner.

In Figure 3 there is disclosed a construction of thermostat commonly referred to as the lever type, but comprising several features in common with the thermostat illustrated in Figure 2. Such figures are illustrated by the same reference characters having a prime (') affixed thereto. With this type of thermostat there may be provided a diaphragm packing 21 for the stem of the valve 14', and the outer end of the valve stem may cooperate with a temperature adjusting screw 22 in the lever 23 pivotally mounted on the arm 24 of the bracket 10'. To the free end of the lever 23 is secured a link 25 pivotally connected to an L-shaped member 26 pivotally carried by the bracket 9' and having secured thereto the lower end of the relatively non-expansible element 16'. With the lever type of thermostat the contraction of the pipe 5' will be effective for moving the lever 23 upwardly to unseat the valve 14', while expansion of the pipe 5' permits closing of the valve.

With the forms of the invention heretofore described it will be apparent that a portion of a standard installation is utilized as the expanding element of the thermostat, and that the entire thermostatic device is detachably clamped in position thereon, thereby maintaining it out of contact with any corrosive fluids.

Figure 6:
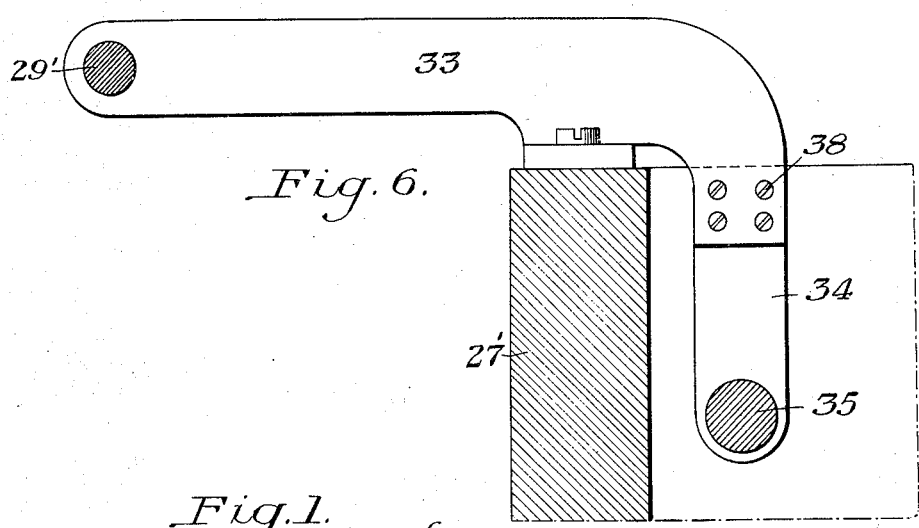
Figure 6 is a detail sectional view on an enlarged scale on the line VI—VI of Figure 5.

In Figure 4 there is illustrated a portion of a metal melting pot 27, such as a die-casting or galvanizing pot, adapted to contain aluminum, zinc, antimony, or other metals at a high temperature. Heretofore considerable difficulty has been experienced in providing a material for use with thermostats which was not more or less quickly attacked by such metals. By the present invention this objection is entirely overcome by simply providing a plurality of brackets 28 suitably secured to any desired portion of the melting pot and carrying the relatively non-expansible element 29. The intermediate brackets may have openings 30 therein serving as guides for the non-expansible element, while the end brackets may carry the fuel valve casing 31 and the temperature adjusting means 32, respectively. In a construction of this character, the expansion of the melting pot will have the same effect as the expansion of the circulating pipe 5 or 5' in the installations heretofore described. Experience has demonstrated that in some cases the melting pots are liable to become warped under the high temperatures to which they are subjected and this warping is apt to produce a binding action on the non-expansible element. In Figures 5 and 6 there is illustrated a modified form of installation capable of overcoming this objectionable tendency.

As disclosed, this modification may comprise a bracket 33 secured in any desired manner to a portion of the melting pot 27' and carrying a depending arm 34 to which is secured one end of an expansible element 35. The opposite end of the expansible element 35 is carried by a similar member 36 having, however, no connection with the pot, while the intermediate portion of the expansible member is guided by a suitable arm 37, also having no connection with the melting pot. The brackets 33 and 36 carry the relatively non-expansible element 29' and the valve casing 31' and adjusting means 32', respectively. The expansible element 35 may be a simple expensive bar of metal of considerable diameter whereby a long life thereof is insured.

If desired, each of the brackets or arms 33, 36 and 37 may be constructed in sections, as illustrated in Figure 6, which sections are secured by suitable fastening means 38 permitting renewal of portions of these parts as may be necessary. Such a construction is admirably adapted both to pots having a tendency to warp, or to pots otherwise presenting a poor expansion member for the thermostat.

The advantages of the present invention arise from the provision of a thermostat which may be easily applied to or removed from a standard installation and in which the thermostatic mechanism is visible.

Further advantages arise from the utilization of a portion of an installation as the expansible element, whereby increased life is provided and corrosive tendencies are minimized.

Throughout the claims the expression "container" has been used in its broadest sense to denote a pipe, tank, pot or other means capable of containing any fluid, cast metal or the like, the temperature of which it is desired to control.

I claim:

1. A thermostatic system, comprising a heat-conducting expansible container constituting a required operating part of a standard heat exchange system, and a device secured as a unit to said container and comprising the combination of an adjustable relatively non-expansible element with a self-closing valve cooperating therewith, said valve being adapted to be operated by the contraction and expansion of the container, substantially as described.

2. A thermostatic system, comprising a heat-conducting expansible container, and a device detachably clamped thereon and bodily removable therefrom without modifying the action of said container, said device comprising in combination a relatively non-expansible element with a valve both detachably secured to said container, said valve cooperating with said relatively non-expansible element and adapted to be operated by the expansion of said container, substantially as described.

3. In a gas fired water heater of the storage type having a circulating pipe, a valve and casing detachably secured to said pipe, a clamp secured to said pipe in spaced relation to said casing and in line with said casing, and a relatively non-expansible member carried by said clamp and cooperating with said valve, substantially as described.

4. In a gas fired water heater of the storage type having a circulating pipe, a valve and casing detachably secured to said pipe, a clamp secured to said pipe in spaced relation to said casing, a relatively non-expansible member carried by said clamp and abutting said valve, means for packing said member, and means independent of said member for effecting movement of the valve in opposition thereto, substantially as described.

5. In a gas fired water heater of the storage type having a circulating pipe, an attachment for said circulating pipe comprising a valve and relatively non-expansible member detachably secured at a plurality of spaced points to said pipe, said pipe serving as an expanding member, and means for adjusting the temperature range through which the valve operates, substantially as described.

6. A thermostatic system, comprising a heat-conducting expansible container, a device secured thereto entirely exteriorly thereof and bodily removable therefrom, said device comprising an adjustable relatively non-expansible element and a self-closing valve, said valve being separate from said element and cooperating therewith for closing movement upon expansion of said container, and packing means cooperating with said element only, substantially as described.

7. A thermostatic device comprising a valve, a relatively non-expansible element mechanically and operatively connected thereto, and brackets for detachably attaching said valve and said element at spaced points to a container, substantially as described.

8. A thermostatic system, comprising a heat-conducting expansible container constituting a portion of a standard installation, a device secured thereto and comprising in combination a relatively non-expansible element and a valve removable as a unit, said valve cooperating with said element and adapted to be operated by the contraction and expansion of said container, and means for varying the temperature at which said valve is initially operated, substantially as described.

9. In a gas fired water heater of the storage type comprising a circulating pipe having a heating means therein, a thermostatically operated valve directly and entirely carried by said pipe and bodily removable therefrom without destroying circulation through said pipe, said pipe serving as an expanding member, and means for varying the temperature at which said valve is effective, substantially as described.

10. In a water-heating system, a storage reservoir, a heater, a circulating connection for supplying cold water to the heater, a circulating connection for supplying heated water from the heater to the reservoir, and thermostatically operable means co-operating with said last mentioned connection intermediate the heater and the reservoir to be acted upon by water leaving the heater and on its passage to the reservoir for controlling the source of heat for the heater, substantially as described.

11. A thermostatic system, comprising a heat-conducting expansible container constituting a required operating part of a heat exchange system, and a device secured as a unit to said container and comprising the combination of an adjustable relatively non-expansible element with a valve normally urged in one direction cooperating therewith, said valve being adapted to be operated by the contraction and expansion of the container, substantially as described.

In testimony whereof I have hereunto set my hand.

GEORGE A. ROBERTSHAW.